United States Patent [19]
Ishikawa et al.

[11] Patent Number: 5,814,394
[45] Date of Patent: Sep. 29, 1998

[54] MAGNETIC RECORDING MEDIUM

[75] Inventors: Akira Ishikawa; Hidehiko Nakayama; Kazutaka Yamashita, all of Tochigi, Japan

[73] Assignee: Kao Corporation, Tokyo, Japan

[21] Appl. No.: 597,961

[22] Filed: Feb. 7, 1996

[30] Foreign Application Priority Data

Feb. 7, 1995 [JP] Japan .................................. 7-019228
Oct. 30, 1995 [JP] Japan .................................. 7-281239

[51] Int. Cl.$^6$ .................................................. G11B 5/716
[52] U.S. Cl. ........................ 428/212; 428/216; 428/323; 428/694 BM; 428/694 BH; 428/900
[58] Field of Search ........................ 428/323, 694 BM, 428/900, 212, 216, 694 BH

[56] References Cited

U.S. PATENT DOCUMENTS 5,178,935 1/1993 Saito et al. .
5,318,828 6/1994 Noguchi et al. ........................ 428/212

*Primary Examiner*—Stevan A. Resan
*Attorney, Agent, or Firm*—Oblon, Spivak, McClelland, Maier & Neustadt, P.C.

[57] ABSTRACT

A magnetic recording medium comprising a support having thereon a plurality of magnetic layers comprising a first magnetic layer provided as an uppermost layer and a second magnetic layer provided adjacent to said first magnetic layer, wherein the first and second magnetic layers each comprises a magnetic powder and a binder containing a vinyl chloride resin and/or cellulose resin, the binder contents in the first magnetic layer and the second magnetic layer satisfy the relationship defined by the following formula (1), and the contents of the vinyl chloride resin and the cellulose resin in the first magnetic layer and the second magnetic layer satisfy the relationship defined by the following formula (2):

$$0.6 \leq (A-B)/B \leq 6 \quad (1)$$
$$0.4 \leq (C-D)/D \leq 11 \quad (2)$$

wherein A represents the ratio of the binder content in the second magnetic layer to the magnetic powder content in the second magnetic layer; B represents the ratio of the binder content in the first magnetic layer to the magnetic powder content in the first magnetic layer; C represents the ratio of the total content of the vinyl chloride resin and the cellulose resin in the second magnetic layer to the magnetic powder content in the second magnetic layer; and D represents the ratio of the total content of the vinyl chloride resin and the cellulose resin in the first magnetic layer to the magnetic powder content in the first magnetic layer. The magnetic recording medium according to the present invention is excellent in surface smoothness, output characteristics, overwritability and running durability.

5 Claims, 1 Drawing Sheet

MAGNETIC RECORDING MEDIUM

FIELD OF THE INVENTION

The present invention relates to a magnetic recording medium which exhibits excellent output characteristics, overwritability and running durability.

BACKGROUND OF THE INVENTION

The magnetic recording medium has heretofore been used in various forms such as a tape, disc, drum and sheet. Such a magnetic recording medium is normally prepared by coating a support with a magnetic coating comprising a magnetic powder and a binder as main components. In recent years, magnetic recording media having a smaller size as well as a higher recording density have been required. In order to meet these requirements, some proposals have been made such as enhancement of coercive force Hc or residual magnetic flux density Br of the magnetic layer and reduction of the thickness of the magnetic layer. The latter proposal involves providing a second layer between the support and the magnetic layer and forming the second layer and the magnetic layer by a multi-layer coating method in which the magnetic layer and the second layer are formed by multi-layer coating.

However, the former proposal is disadvantageous in that the overwritability deteriorates. In the latter proposal, it is necessary that the fluidity of the coating composition for forming the magnetic layer match that of the coating composition for forming the second layer. However, it is not yet possible to match the fluidity of the two coating compositions to each other. This causes disorder in the interface of the magnetic layer with the second layer and impairs the surface smoothness of the magnetic layer, thereby deteriorating the electromagnetic conversion characteristics of the magnetic recording medium.

On the other hand, magnetic recording media may show some deterioration of surface smoothness due to maldispersion of magnetic powder caused by an excess or deficiency in the ratio of the content of the binder used to that of the magnetic powder. Further, if the content of the binder is too low, the resulting adhesivity is reduced. On the other hand, if the content of the binder is too high, sticking or blocking can occur. These problems result in deterioration of the running durability of the magnetic recording media.

In order to improve both the overwritability and running durability, U.S. Pat. No. 5,178,935 proposes a magnetic recording medium comprising the foregoing second layer, which contains a magnetic powder and a binder, and wherein a vinyl chloride resin and/or cellulose resin is used as the binder in an amount of from about 3 to 24 parts by weight based on 100 parts by weight of the magnetic powder.

However, the foregoing proposal leaves further room for be desired in the improvement of both the overwritability and running durability of the magnetic recording medium. It has thus been desired to develop a magnetic recording medium excellent in both overwritability and running durability.

SUMMARY OF THE INVENTION

It is therefore an object of the present invention to provide a magnetic recording medium which exhibits good surface smoothness and excellent output characteristics, overwritability and running durability.

The inventors made extensive studies of the foregoing object. As a result, it was found that the foregoing object can be accomplished with a magnetic recording medium comprising a magnetic powder and a binder containing a specific resin incorporated in the uppermost layer and its adjacent layer wherein the contents of the binder and the specific resin in the two layers are controlled in specific relationships.

The present invention has been completed based on the above finding, and it is to provide a magnetic recording medium comprising a support having thereon a plurality of magnetic layers comprising a first magnetic layer provided as an uppermost layer and a second magnetic layer provided adjacent to the first magnetic layer, wherein the first and second magnetic layers each comprises a magnetic powder and a binder containing a vinyl chloride resin and/or cellulose resin, the binder contents in the first magnetic layer and the second magnetic layer satisfy the relationship defined by the following equation (1), and the contents of the vinyl chloride resin and the cellulose resin in the first magnetic layer and the second magnetic layer satisfy the relationship defined by the following equation (2):

$$0.6 \leq (A-B)/B \leq 6 \qquad (1)$$

$$0.4 \leq (C-D)/D \leq 11 \qquad (2)$$

wherein A represents the ratio of the binder content in the second magnetic layer to the magnetic powder content in the second magnetic layer; B represents the ratio of the binder content in the first magnetic layer to the magnetic powder content in the first magnetic layer; C represents the ratio of the total content of the vinyl chloride resin and the cellulose resin in the second magnetic layer to the magnetic powder content in the second magnetic layer; and D represents the ratio of the total content of the vinyl chloride resin and the cellulose resin in the first magnetic layer to the magnetic powder content in the first magnetic layer.

BRIEF DESCRIPTION OF THE DRAWING

By way of example and to make the description more clear, reference is made to the accompanying drawings in which.

DETAILED DESCRIPTION OF THE INVENTION

Figure 1:
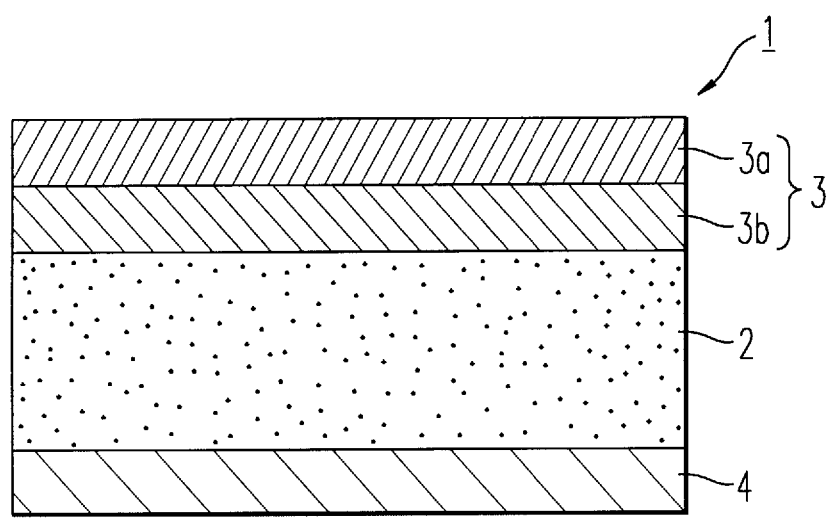
FIG. 1 is a schematic sectional view illustrating the structure of a magnetic recording medium according to the present invention.

The magnetic recording medium of the present invention will be further described hereinafter.

A preferred embodiment of the magnetic recording medium of the present invention will be first described by way of example with reference to FIG. 1.

The magnetic recording medium 1 shown in FIG. 1 comprises a support 2, a plurality of magnetic layers 3, the plurality of magnetic layers 3 comprising a first magnetic layer 3a provided as an uppermost layer and a second magnetic layer 3b provided adjacent to the first magnetic layer 3a. A backcoat layer 4 may optionally be provided on support 2 on the side opposite to the magnetic layers.

Besides the support, first magnetic layer, second magnetic layer and backcoat layer, the magnetic recording medium of the present invention may further comprise other layers such as a primer layer provided between the support and the second magnetic layer or the backcoat layer, an overcoat layer containing a lubricant layer or the like provided on the first magnetic layer and a third magnetic layer provided on the first magnetic layer for recording a servo signal or the like adapted for a hard system using a long wavelength signal.

As the support 2 to be used in the magnetic recording medium of the present invention there may be used either a magnetic support or non-magnetic support. In particular, a non-magnetic support is preferred.

Any known non-magnetic support there may be normally used. Specific examples of the non-magnetic support usable herein include a flexible film or disc made of a polymer resin, and a film, disc or card made of a non-magnetic metal such as Cu, Al and Zn or ceramic such as glass, porcelain and earthenware.

Examples of the polymer resin for forming the flexible film or the disc include polyesters such as polyethylene terephthalate, polybutylene terephthalate, polyethylene naphthalate, polycyclohexylene dimethylene terephthalate and polyethylene bisphenoxy carboxylate, polyolefins such as polyethylene and polypropylene, cellulose derivatives such as cellulose acetate butyrate and cellulose acetate propionate, vinyl resins such as polyvinyl chloride and polyvinylidene chloride, polyamide, polyimide, polycarbonate, polysulfone, polyether-ether ketone, and polyurethane. These high molecular resins may be used singly or in combination.

In the magnetic recording medium of the present invention, the backcoat layer to be optionally provided on the back side of the support may be formed using any known backcoat composition.

In the magnetic recording medium of the present invention, the first magnetic layer is a layer to be provided as an uppermost layer of the magnetic recording medium, i.e., a layer disposed on the surface of the magnetic recording medium. The first magnetic layer comprises a magnetic powder and a binder containing a vinyl chloride resin and/or cellulose resin. The first magnetic layer is formed by applying a first magnetic coating composition onto a second magnetic layer described later.

As the first magnetic coating composition there may be preferably used a coating composition comprising a magnetic powder, a binder containing a vinyl chloride resin and/or cellulose resin, and a solvent as main components.

Examples of the magnetic powder to be incorporated in the first magnetic coating composition include a ferromagnetic metal powder mainly comprising iron, and a hexagonal ferrite powder.

The coercive force of the ferromagnetic metal powder is preferably from 1,400 to 2,500 Oe. The coercive force of the hexagonal ferrite powder is preferably from 900 to 2,300 Oe.

The saturated magnetization of the ferromagnetic metal powder is preferably from 100 to 180 emu/g, more preferably from 110 to 160 emu/g. The saturated magnetization of the hexagonal ferrite powder is preferably from 30 to 70 emu/g, more preferably from 45 to 70 emu/g.

Accordingly, the coercive force of the first magnetic layer containing the ferromagnetic metal powder is preferably from 1,500 to 2,600 Oe, more preferably from 1,500 to 2,400 Oe, particularly from 1,600 to 2,200 Oe. The coercive force of the first magnetic layer containing the hexagonal ferrite powder is preferably from 1,100 to 3,200 Oe, more preferably from 1,100 to 2,200 Oe. The saturated magnetic flux density of the first magnetic layer containing the ferromagnetic metal powder is preferably from 3,000 to 4,500 Gauss, more preferably from 3,200 to 4,000 Gauss. The saturated magnetic flux density of the first magnetic layer containing the hexagonal system ferrite powder is preferably from 1,500 to 2,500 Gauss, more preferably from 1,600 to 2,300 Gauss.

As the ferromagnetic metal powder there may be used a ferromagnetic metal powder having a metal content of 50% by weight or more, the metal content comprising Fe in a proportion of 60% by weight or more. Specific examples of the ferromagnetic metal include Fe—Co, Fe—Ni, Fe—Al, Fe—Ni—Al, Fe—Co—Ni, Fe—Ni—Al—Zn, and Fe—Al—Si. The ferromagnetic metal powder is preferably acicular or spindle-shaped. The major axis length of the ferromagnetic metal powder is preferably from 0.05 $\mu$m to 0.25 $\mu$m, more preferably from 0.05 $\mu$m to 0.2 $\mu$m. The acicularity ratio of the ferromagnetic metal powder is preferably from 3 to 20, more preferably from 3 to 13. The crystal size of the ferromagnetic metal powder is preferably from 120 Å to 270 Å, more preferably from 130 Å to 250 Å, particularly from 140 Å to 200 Å.

As the hexagonal ferrite powder there may be used a microtabular barium ferrite or strontium ferrite or a magnetic powder obtained by replacing some of Fe atoms in the ferrite by an atom such as Ti, Co, Ni, Zn and V. The hexagonal ferrite powder preferably has a tablet diameter of from 0.02 to 0.09 $\mu$m, more preferably from 0.02 to 0.07 $\mu$m, and a tabularity ratio of from 2 to 7, more preferably from 2 to 6.

The magnetic powder to be incorporated in the first magnetic coating composition may comprise a rare earth element or transition metal element incorporated therein as necessary.

In the present invention, the magnetic powder may be subjected to surface treatment to enhance the dispersibility or other properties thereof.

The surface treatment may be accomplished in accordance with the method as described in "Characterization of Powder Surfaces", Academic Press. For example, a method may be employed which comprises coating the surface of the magnetic powder with an inorganic oxide. Examples of the inorganic oxide to be used herein include $Al_2O_3$, $SiO_2$, $TiO_2$, $ZrO_2$, $SnO_2$, $Sb_2O_3$, and ZnO. These inorganic oxides may be used singly or in admixture.

The surface treatment can also be accomplished by an organic treatment such as a silane coupling treatment, a titanium coupling treatment and an alumina coupling treatment.

The binder to be incorporated in the first magnetic coating composition contains the vinyl chloride resin and/or cellulose resin, and optionally other resins and hardeners.

Examples of the vinyl chloride resin include polyvinyl chloride, and copolymers of vinyl chloride with another copolymerizable monomer. Examples of the copolymerizable monomer include $C_{2-8}$ alkanol esters of an $\alpha$-$\beta$ unsaturated acid such as (meth)acrylic acid-2-hydroxyethyl ester and (meth)acrylic acid-2-hydroxypropyl ester; esters of polyalkylene glycol with (meth)acrylic acid represented by the formula $CH_2=CR-COO-(C_nH_{2n}O)_m-H$ (wherein m represents an integer of from 2 to 9, n represents an integer of from 2 to 4, and R represents a hydrogen atom or a methyl group); mono(meth)acrylic esters of a dicarboxylic dihydroxyester (e.g., 2-hydroxyethyl-2'-(meth)acryloyloxy phthalate, 2-hydroxyethyl-2'-(meth)acryloyloxy succinate); (meth)acrylamides such as N-methylol (meth)acrylamide; alkylene glycol esters of an unsaturated dicarboxylic acid such as di-2-hydroxyethyl maleate, di-4-hydroxybutyl maleate and di-2-hydroxypropyl itaconate; olefin alcohols such as 3-butene-1-ol and 5-hexene-1-ol; vinyl ethers such as 2-hydroxyethylvinyl ether and 2-hydroxypropylvinyl ether; mono(meth)allyl ethers of an alkylene glycol such as (meth) allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether and (meth)allyl-6-hydroxyhexyl ether; polyoxyalkylene glycol (meth) monoallyl ethers such as diethylene glycol (meth)allyl ether and dipropylene glycol mono(meth)allyl ether; mono(meth) allyl ethers of a halogen-substituted or hydroxyl-substituted product of a (poly)alkylene glycol such as glycerin mono (meth)allyl ether, (meth)allyl-2-chloro-3-hydroxypropyl ether and (meth)allyl-2-hydroxy-3-chloropropyl ether; mono(meth)allyl ethers of a polyhydroxy phenol and halogen-substituted product thereof such as eugenol and isoeugenol; mono(meth)allyl ethers or mono(metha) thioallyl ethers of a polyhydroxy compound such as an alkylene glycol (meth)allyl thioether (e.g., (meth)allyl-2-hydroxyethyl thioether and (meth)allyl-2-hydroxypropyl thioether; vinyl alcohol; and (meth)allyl alcohol.

Preferred among these copolymerizable monomers are mono(meth)allyl ethers and mono(meth)thioallyl ethers of a polyhydroxy compound in the light of thermal stability and reactivity.

In the copolymerization of the vinyl chloride with another copolymerizable monomer, the weight ratio of the vinyl chloride to the copolymerizable monomer is preferably from 30/60 to 99/1, more preferably from 40/60 to 99/1, particularly from 50/50 to 95/5.

As the polyvinyl chloride or the copolymer of vinyl chloride with another copolymerizable monomer to be used as the vinyl chloride resin in the present invention there may be preferably used a vinyl chloride resin having at least one polar group selected from the group consisting of —COOM, —SO$_3$M, —OSO$_3$M, —P=O(OM')$_2$, —O—P=O(OM')$_2$ (wherein M represents a hydrogen atom, an alkaline metal or an ammonium group, M' represents a hydrogen atom, an alkaline metal, an ammonium group or a C$_{1-20}$ alkyl group), —OH, —NR$_2$, —N$^{30}$R$_3$ (wherein R represents a C$_{1-20}$ hydrocarbon group), an epoxy group, —SH, —CN, and sulfobetaine introduced therein by copolymerization, addition reaction or the like.

The content of the polar group is preferably from $10^{-1}$ to $10^{-6}$ eq/g, more preferably from $10^{-2}$ to $10^{-6}$ eq/g.

Specific examples of the vinyl chloride resin to be used in the present invention include commercial products such as MR110, MR115, MR113, MR112, MR105, MR104 (available from Nippon Zeon Co., Ltd.), VAGH, VYHH, VMCH, VAGF, VAGD, VROH, VYNC, VMCC, PKHJ, PKHC, PKFE, XYHL, XYSG, and PKHH (available from Union Carbite Inc.). The vinyl chloride resin preferably has a number-average molecular weight of from 2,000 to 30,000, particularly from 3,000 to 25,000.

Examples of the cellulose resin include nitrocellulose, cellulose acetate butyrate, cellulose diacetate, cellulose triacetate, cellulose propionate, ethyl cellulose, methyl ethyl cellulose, carboxy methyl cellulose, and acetyl cellulose. Specific examples of these cellulose resins include BTH-½, BTH-¼, BTH-⅛, BTH-1/16, BT-SL, and VX-1 (available from Asahi Kasei Kogyo K.K.). The cellulose resin preferably has a number-average molecular weight of from 2,000 to 35,000, particularly from 3,000 to 33,000.

As the other resins there may be used thermoplastic, thermosetting or reactive resins such as polyester, polyurethane and epoxy resin and resins described in JP-A-57-162128 (The term "JP-A" as used herein means an "unexamined published Japanese patent application"), line 19 in the upper right column of page 2 to line 19 in the lower right column of page 2, as well as the vinyl chloride resin and/or cellulose resin.

Examples of the hardener include a polyisocyanate compound. Specific examples of the polyisocyanate compound include diisocyanates such as tolylene diisocyanate, diphenylmethane diisocyanate, hexamethylene diisocyanate and isophorone diisocyanate, and trimethylolpropane adduct, burette-bonded type or isocyanurate type of these diisocyanates. Commercially available products of them may be used.

The vinyl chloride resin and the cellulose resin, and the other resins and the hardeners may be used singly or in admixture.

If the first magnetic layer comprises the vinyl chloride resin and the cellulose resin in admixture, the weight ratio of the vinyl chloride resin to the cellulose resin is preferably from 2/98 to 98/2, more preferably from 30/70 to 95/5.

The total amount of the vinyl chloride resin and the cellulose resin to be incorporated in the first magnetic coating composition is preferably from 10 to 90% by weight, more preferably from 15 to 80% by weight, based on the total weight of the binder. The amount of the hardener, if any, to be used is preferably from 5 to 60% by weight, more preferably from 10 to 50% by weight, based on the total weight of the binder.

The binder to be incorporated in the first magnetic coating composition preferably contains a resin containing a polar group incorporated therein to enhance the dispersibility thereof.

The amount of the binder to be incorporated in the first magnetic coating is preferably from 3 to 50 parts by weight, particularly from 5 to 40 parts by weight, based on 100 parts by weight of the magnetic powder.

Examples of the solvent to be used for the first magnetic coating composition include a ketone solvent, an ester solvent, an ether solvent, an aromatic hydrocarbon solvent, and a chlorinated hydrocarbon solvent. In particular, solvents described in JP-A-57-162128, line 17 in the lower right column of page 3 to line 10 in the lower left column of page 4, may be used.

The amount of the solvent to be used is preferably from 80 to 500 parts by weight, more preferably from 100 to 350 parts by weight, based on 100 parts by weight of the magnetic powder.

The first magnetic coating composition may comprise additives commonly used for magnetic recording medium such as a dispersant, a lubricant, an abrasive, an antistatic agent, a rust preventive agent and fungicide as necessary. Specific examples of these additives include various additives described in JP-A-57-162128, line 6 in the upper left column of page 2 to line 10 in the upper right column of page 2, and line 6 in the upper left column of page 3 to line 18 in the upper right column of page 3.

The preparation of the foregoing first magnetic coating composition can be accomplished, e.g., by a process which comprises charging the magnetic powder and the binder containing a vinyl chloride resin and/or cellulose resin with a part of a solvent to be used into a Nauter mixer or the like, stirring these materials to obtain a mixture, kneading the mixture by means of a continuous pressure kneader or the like, diluting the mixture with another part of the solvent, subjecting the mixture to dispersion by means of a sand mill or the like, adding an additive such as a lubricant to the dispersion, filtering the dispersion, and then mixing the resulting dispersion with the remainder of the solvent.

The thickness of the first magnetic layer is preferably from 0.05 to 1.0 $\mu$m, more preferably from 0.05 to 0.8 $\mu$m. If the thickness of the first magnetic layer falls below 0.05 $\mu$m, it is difficult to carry out uniform coating and occasionally, deterioration in the durability of the magnetic layer results. On the other hand, if the thickness of the first magnetic layer exceeds 1.0 $\mu$m, thickness loss is increased, occasionally resulting in a remarkable deterioration in overwritability. Thus, the foregoing thickness range is preferred.

The second magnetic layer to be provided adjacent to the first magnetic layer of the magnetic recording medium of the present invention is a layer comprising a magnetic powder and a binder containing a vinyl chloride resin and/or cellulose resin. The second magnetic layer is formed by applying a second magnetic coating composition onto the support.

As the second magnetic coating composition there may be preferably used a coating composition comprising as main components the magnetic powder, the binder containing a vinyl chloride resin and/or cellulose resin, and a solvent.

Examples of the magnetic powder to be incorporated in the second magnetic coating composition include a high magnetic permeability material such as a soft magnetic powder, and a ferromagnetic powder.

As the soft magnetic powder there may be preferably used those used in so-called electrical appliances such as a magnetic head and an electronic circuit. For example, soft magnetic materials as described in Satonobu Chikazumi, "Kyojiseitai no Butsuri (Ge) Jikitokusei to Oyou" (Physics of Ferromagnetic Materials (volume II) Magnetic property and Application), pages 368–376, Shokabo, 1984 may be used. Specific examples of the soft magnetic material include an oxide soft magnetic powder.

As the oxide soft magnetic powder there may be preferably used a spinel type ferrite powder. Specific examples of the spinel type ferrite include $MnFe_2O_4$, $Fe_3O_4$, $CoFe_2O_4$, $NiFe_2O_4$, $MgFe_2O_4$, $Li_{0.5}Fe_{2.5}O_4$, Mn—Zn ferrite, Ni—Zn ferrite, Ni—Cu ferrite, Cu—Zn ferrite, Mg—Zn ferrite, and Li—Zn ferrite. Preferred among these spinel type ferrites are Mn—Zn ferrite and Ni—Zn ferrite. The ferrites may be used singly or in combination.

As the soft magnetic powder there may be also used a metal soft magnetic powder or the like.

Examples of the metal soft magnetic powder to be used herein include Fe—Si alloy, Fe—Al alloy (e.g., Alperm, Alfenol, Alfer), permalloy (e.g., N—Fe binary alloy, plural alloy obtained by adding Mo, Cu, Cr or the like to the binary alloy), sendust (Fe—Si—Al (Si: 9.6% by weight; Al: 5.4% by weight; balance: Fe)), and Fe—Co alloy. These metal soft magnetic powders may be used singly or in combination.

The oxide soft magnetic powder normally exhibits a coercive force of from 0.1 to 150 Oe and a saturated magnetization of from 30 to 90 emu/g. The metal soft magnetic powder normally exhibits a coercive force of from 0.02 to 100 Oe and a saturated magnetization of from 50 to 500 emu/g.

The particle diameter of the soft magnetic powder is preferably from 1 m$\mu$ to 1,000 m$\mu$, more preferably from 1 m$\mu$ to 500 m$\mu$.

The specific surface area of the soft magnetic powder is preferably from 10 to 50 m$^2$/g, more preferably from 10 to 40 m$^2$/g.

The soft magnetic powder can be prepared as follows.

The metal soft magnetic powder can be obtained by spraying a molten alloy in vacuo. The oxide soft magnetic powder can be obtained by glass crystallization method, coprecipitation calcining method, calcination method, hydrothermal synthesis method, flux method, alkoxide method, plasma jet method or the like. Preferred among these methods are glass crystallization method, coprecipitation method, and hydrothermal synthesis method.

Examples of the ferromagnetic powder to be incorporated in the second magnetic coating composition include ferromagnetic metal powder mainly comprising iron, and hexagonal ferrite powder, such as those disclosed above for the first magnetic coating composition.

The coercive force of the ferromagnetic metal powder is preferably from 1,400 to 2,500 Oe. The coercive force of the hexagonal ferrite powder is preferably from 900 to 2,300 Oe, more preferably from 1,200 to 2,000 Oe.

The saturated magnetization of the ferromagnetic metal powder is preferably from 100 to 180 emu/g, more preferably from 110 to 160 emu/g. The saturated magnetization of the hexagonal ferrite powder is preferably from 30 to 70 emu/g, more preferably from 45 to 70 emu/g.

Accordingly, the coercive force of the second magnetic layer containing the ferromagnetic metal powder is preferably from 500 to 2,600 Oe, more preferably from 500 to 2,400 Oe, particularly from 1,250 to 2,000 Oe. The coercive force of the second magnetic layer containing the hexagonal ferrite powder is preferably from 500 to 3,200 Oe, more preferably from 500 to 2,200 Oe, particularly from 1,250 to 2,000 Oe. The saturated magnetic flux density of the second magnetic layer containing the magnetic metal powder is preferably from 100 to 4,500 Gauss, more preferably from 200 to 3,000 Gauss. The saturated magnetic flux density of the second magnetic layer containing the hexagonal ferrite powder is preferably from 100 to 2,500 Gauss, more preferably from 200 to 2,000 Gauss.

As the ferromagnetic metal powder there may be used a ferromagnetic metal powder having a metal content of 50% by weight or more, the metal content comprising Fe in a proportion of 60% by weight or more. Specific examples of the ferromagnetic metal include Fe—Co, Fe—Ni, Fe—Al, Fe—Ni—Al, Fe—Co—Ni, Fe—Ni—Al—Zn, and Fe—Al—Si. The ferromagnetic metal powder preferably has an acicular or spindle-like shape. The major axis length of the ferromagnetic metal powder is preferably from 0.05 $\mu$m to 0.25 $\mu$m, more preferably from 0.05 $\mu$m to 0.2 $\mu$m. The acicularity ratio of the ferromagnetic metal powder is preferably from 3 to 20, more preferably from 3 to 13. The crystal size of the ferromagnetic metal powder is preferably from 120 Å to 270 Å, more preferably from 130 Å to 250 Å, particularly from 140 Å to 200 Å.

As the hexagonal ferrite powder there may be used a microtabular barium ferrite or strontium ferrite or a magnetic powder obtained by replacing some of Fe atoms in the ferrite by an atom such as Ti, Co, Ni, Zn and V. The hexagonal ferrite powder preferably has a tablet diameter of from 0.02 to 0.09 $\mu$m, more preferably from 0.02 to 0.07 $\mu$m, and a tabularity ratio of from 2 to 7, more preferably from 2 to 6.

As the ferromagnetic powder there may be preferably used the hexagonal ferrite powder, particularly a tabular hexagonal ferrite powder.

The binder to be incorporated in the second magnetic coating composition comprises the vinyl chloride resin and/or cellulose resin, and optionally other resins and hardeners.

As the vinyl chloride resin there may be used the vinyl chloride resin to be incorporated in the first magnetic coating composition.

As the cellulose resin there may be used the cellulose resin to be incorporated in the first magnetic coating composition.

As the other resin and hardener there may be used the other resins and hardeners which may be incorporated in the first magnetic coating composition.

When the second magnetic layer comprises the vinyl chloride resin and the cellulose resin in admixture, the weight ratio of the content of the vinyl chloride resin to the content of the cellulose resin is preferably from 2/98 to 98/2, more preferably from 30/70 to 95/5.

Further, the ferromagnetic powder as used in the first magnetic coating composition may be used in the second magnetic coating composition.

The total amount of the vinyl chloride resin and the cellulose resin to be incorporated in the second magnetic coating composition is preferably from 10 to 90% by weight, more preferably from 15 to 80% by weight, based on the total weight of the binder. The amount of the hardener, if any, to be used is preferably from 5 to 60% by weight, more preferably from 10 to 50% by weight.

The binder to be incorporated in the second magnetic coating composition preferably contains a resin containing a polar group to enhance the dispersibility.

The amount of the binder to be incorporated in the second magnetic coating composition is preferably from 20 to 120 parts by weight, particularly from 30 to 110 parts by weight, based on 100 parts by weight of the magnetic powder.

As the solvent to be used for the second magnetic coating composition there may be used the solvent as used in the first magnetic coating composition.

The amount of the solvent to be used in the second magnetic coating composition is preferably from 80 to 500 parts by weight, more preferably from 100 to 350 parts by weight, based on 100 parts by weight of the magnetic powder to be incorporated in the second magnetic coating composition.

The second magnetic coating composition may comprise additives commonly used for magnetic recording medium such as a dispersant, a lubricant, an abrasive, an antistatic agent, a rust preventive agent and a fungicide as necessary. Specific examples of these additives include additives described in JP-A-57-162128, line 6 in the upper left column of page 2 to line 10 in the upper right column of page 2, and line 6 in the upper left column of page 3 to line 18 in the upper right column of page 3.

The second magnetic coating composition may further comprise a non-magnetic powder.

The non-magnetic powder is not specifically limited so long as it is non-magnetic. Examples of non-magnetic materials usable herein include powders of carbon black, graphite, titanium oxide, barium sulfate, zinc sulfide, magnesium carbonate, calcium carbonate, zinc oxide, calcium oxide, magnesium oxide, tungsten disulfide, molybdenum disulfide, boron nitride, tin dioxide, silicon dioxide, non-magnetic chromium oxide, alumina, silicon carbide, cerium oxide, corundum, artificial diamond, non-magnetic iron oxide, garnet, fluorite, silicon nitride, molybdenum carbide, boron carbide, tungsten carbide, titanium carbide, diatomaceous earth, dolomite, and a resin. Particularly preferred among these non-magnetic materials are carbon black, titanium oxide, barium sulfate, calcium carbonate, alumina, and non-magnetic iron oxide.

The non-magnetic powder may be subjected to a surface treatment in the same manner as in the surface treatment for the magnetic powder to be incorporated in the first magnetic coating composition to enhance the dispersibility.

The thickness of the second magnetic layer is preferably from 0.2 to 5 $\mu$m, more preferably 0.5 to 4 $\mu$m, particularly from 0.5 to 2.5 $\mu$m. If the thickness of the second magnetic layer falls below 0.2 $\mu$m, the resulting magnetic recording medium has a reduced nerve. On the other hand, if the thickness of the second magnetic layer exceeds 5 $\mu$m, the resulting magnetic recording medium has a reduced overwritability. Thus, the thickness of the second magnetic layer preferably is in the above specified range.

In the magnetic recording medium of the present invention, the binder contents in the first magnetic layer and the second magnetic layer satisfy the relationship defined by the following formula (1), preferably the following formula (1'), and the total contents of the vinyl chloride resin and the cellulose resin in the first magnetic layer and in the second magnetic layer satisfy the relationship defined by the following formula (2), preferably the following formula (2'):

$$0.6 \leq (A-B)/B \leq 6 \tag{1}$$

$$0.8 \leq (A-B)/B \leq 5 \tag{1'}$$

$$0.4 \leq (C-D)/D \leq 11 \tag{2}$$

$$0.6 \leq (C-D)/D \leq 10 \tag{2'}$$

wherein A represents the ratio of the binder content in the second magnetic layer to the magnetic powder content in the second magnetic layer; B represents the ratio of the binder content in the first magnetic layer to the magnetic powder content in the first magnetic layer; C represents the ratio of the content of the vinyl chloride resin and the cellulose resin in the second magnetic layer to the magnetic powder content in the second magnetic layer; and D represents the ratio of the total content of the vinyl chloride resin and the cellulose resin in the first magnetic layer to the magnetic powder content in the first magnetic layer.

If the value (A−B)/B falls below 0.6, the resulting magnetic recording medium exhibits a reduced running durability or is a great-likelihood of errors such as head clogging. On the other hand, if the value (A−B)/B exceeds 6, it becomes difficult to form an interface between the layers. Further, the resulting magnetic recording medium is more likely to exhibit errors caused by dropping of magnetic powder, and the like.

The magnetic recording medium of the present invention is useful as a magnetic tape such as audio tape, video tape and magnetic tape for computer use. Alternatively, the magnetic recording medium of the present invention can be used as a magnetic recording medium such as floppy disc.

The outline of the process for the preparation of the magnetic recording medium of the present invention will be described hereinafter.

The support is simultaneous multi-layer coated with the first magnetic coating composition and the second magnetic coating composition by a wet-on-wet process in such a manner that the dry thickness of the first and second magnetic layers respectively become the above defined values, thereby forming coating films of the first and second magnetic layers. Namely, the first magnetic layer is preferably applied and formed while the second magnetic layer is wet.

Subsequently, the coating film is oriented in a magnetic field. The coated material is dried, and then wound. Thereafter, the coated material is calendered as necessary, and then provided with a backcoat layer as necessary. Subsequently, the coated material, if used as a magnetic tape, is aged at a temperature of from 40° to 70° C. for from 6 to 72 hours as necessary, and then slit into a desired width.

The simultaneous multi-layer coating method is described in JP-A-5-73883, line 31 in the 42nd column to line 31 in the 43rd column. This method comprises application of the first magnetic coating composition for forming the first magnetic layer before the second magnetic coating composition for forming the second magnetic layer is dried. In accordance with this simultaneous multi-layer coating method, a smooth interface can be provided between the first magnetic layer and the second magnetic layer. At the same time, the first magnetic layer can be provided with good surface properties. Thus, a magnetic recording medium having a good coating film (first magnetic layer and second magnetic layer) durability which is less liable to cause dropout and which can be used in high density recording can be obtained.

The magnetic orientation is conducted before the first and second magnetic coating films are dried. For example, if the magnetic recording medium of the present invention is a magnetic tape, a magnetic field of about 500 Oe or more, preferably from about 1,000 to 10,000 Oe, may be applied in parallel to the surface of the first magnetic coating film. Alternatively, the magnetic orientation may be carried out by passing the magnetic recording medium through a solenoid of from 1,000 to 10,000 Oe while the first and second magnetic coating films are wet.

The drying of the coated material can be accomplished by supplying a gas which has been heated to a temperature of from 30° to 120° C. During this process, the dryness of the coating film can be controlled by controlling the temperature of the gas and the feed rate of the gas.

The calendering of the coated material can be accomplished by a supercalendering process which comprises passing the coated material between two rolls of a metal roll, a cotton roll, a synthetic resin roll and a metal roll and the like. The calendering can be effected at a temperature of from 60° to 140° C. under a pressure of from 100 to 500 kg/cm.

The backcoat layer to be optionally provided is provided on the back side of the support (opposite to the first and second magnetic layers). The backcoat layer can be obtained by applying a backcoat coating composition commonly used for the formation of backcoat layers to the support.

In the preparation of the magnetic recording medium of the present invention, the surface of the magnetic layer may be finished by polishing, cleaning or the like, if necessary. The application of the first and second magnetic coating compositions can be also accomplished by a known successive multi-layer coating method.

The present invention will be further described in the following examples and comparative examples, but the present invention should not be construed as being limited thereto.

EXAMPLE 1

A first magnetic coating composition A having the following formulation and a second magnetic coating composition (a) having the following formulation were used in the combination as set forth in Table 1. As a backcoat coating composition there was used a backcoat coating composition having the following formulation. A magnetic tape was then prepared in accordance with the following process for the preparation of magnetic recording medium to give the magnetic tape in the form of a magnetic recording medium comprising first and second magnetic layers formed by the first and second magnetic coating compositions set forth in Table 1, respectively.

The first magnetic layer formed by the first magnetic coating composition A was measured for its coercive force and saturated magnetic flux density in accordance with the method described later. As a result, the first magnetic layer exhibited a coercive force of 1,895 Oe and a saturated magnetic flux density of 3,600 Gauss.

| First magnetic coating composition A | |
|---|---|
| Acicular magnetic metal powder mainly composed of iron (coercive force: 1,860 Oe; saturated magnetization: 137 emu/g; average major axis length: 0.1 μm) | 100 parts by weight |
| Alumina (average particle diameter: 0.3 μm) | 9 parts by weight |
| Carbon black (average primary particle diameter: 50 nm) | 1 part by weight |
| MR104 (trade name, sulfonic group-containing vinyl chloride resin, available from Nippon Zeon Co., Ltd.; number-average molecular weight: 17,000 (as determined by GPC)) | 10 parts by weight |
| Sulfonic group-containing polyurethane (number-average molecular weight: 23,000 (as determined by GPC)) | 7 parts by weight |
| Stearic acid | 2 parts by weight |
| 2-Ethylhexyl oleate | 1.5 parts by weight |
| Colonate HX (trade name, polyisocyanate compound, available from Nihon Polyurethane Industry Co., Ltd.) | 4.5 parts by weight |
| Methyl ethyl ketone | 100 parts by weight |
| Toluene | 60 parts by weight |
| Cyclohexanone | 100 parts by weight |
| Second magnetic coating composition (a) | |
| Acicular α-iron oxide (average major axis length: 0.07 μm) | 70 parts by weight |
| Mn—Zn ferrite (soft magnetic oxide powder) (average particle diameter: 0.04 μm) | 32 parts by weight |
| Carbon black (average primary particle diameter: 0.023 μm) | 3.5 parts by weight |
| Alumina (average particle diameter: 0.2 μm) | 3 parts by weight |
| MR104 (trade name, sulfonic group-containing vinyl chloride resin, available from Nippon Zeon Co., Ltd.; number-average molecular weight: 17,00 (as determined by GPC)) | 12 parts by weight |
| Sulfonic group-containing polyurethane (number-average molecular weight: 23,000 (as determined by GPC)) | 6 parts by weight |
| Colonate L (trade name, polyisocyanate available from Nippon Polyurethane Industry Co., Ltd.). | 3.5 parts by weight |
| Oleyl oleate | 2 parts by weight |
| Myristic acid | 1 part by weight |
| Methyl ethyl ketone | 60 parts by weight |
| Toluene | 30 parts by weight |
| Cyclohexanone | 90 parts by weight |
| Formulation of backcoat composition | |
| Carbon black (average primary particle diameter: 0.028 μm) | 32 parts by weight |
| Carbon black (average primary particle diameter: 0.052 μm) | 8 parts byweight |
| Nippolan 2301 (trade name, polyurethane available from Nippon Polyurethane Industry | 20 parts by weight |

-continued

| | |
|---|---|
| Co., Ltd.) Nitrocellulose (available from Hercules Powder Co., Ltd.; viscosity (label): ½ sec.) | 20 parts by weight |
| D-250N (trade name, polyisocyanate, available from Takeda Chemical Industries, Ltd.) | 4 parts by weight |
| Copper phthalocyanine | 5 parts by weight |
| Stearic acid | 1 part by weight |
| Methyl ethyl ketone | 120 parts by weight |
| Toluene | 120 parts by weight |
| Cyclohexanone | 120 parts by weight |

1. Preparation of magnetic recording medium

The surface of a 6-μm thick polyethylene naphthalate film was simultaneous multi-layer coated with the first magnetic coating composition and the second magnetic coating composition by a wet-on-wet process so as to give a dry thickness of 0.3 μm and 2.5 μm, respectively, to form coating films of the first and second magnetic layers. The coated material was then passed through a solenoid of 5,000 Oe while the coating film was wet so that it was oriented in a magnetic field. The coated material thus oriented was dried at a temperature of from 60° C. to 100° C., and then wound. The coated material was then calendered at a temperature of 85° C. under a pressure of 300 kg/cm to form first and second magnetic layers. The backcoat composition was then applied to the back side of the support so as to give a dry thickness of 0.5 μm. The coated material was dried at a temperature of 90° C., and then wound. Thereafter, the coated material was aged at a temperature of 50° C. for 16 hours, and then slit into tapes having a width of 3.81 mm to obtain a 3.81-mm wide magnetic tape ((A–B)/B=2.13; (C–D)/D=2.75). The magnetic tape thus obtained was then evaluated for its surface roughness, output (4.7 MHz), overwritability and running durability. The results are set forth in Table 1.

2. Measurement

Coercive force and saturated magnetic flux density

The first magnetic layer was peeled off from the laminate of the support and the second magnetic layer with an adhesive tape. A specimen having a predetermined size and shape was then stamped out from the first magnetic layer. The specimen was then measured for its coercive force and saturated magnetic flux density of an applied magnetic field of 10 kOe by means of an oscillating magnetometer.

Surface roughness of magnetic recording medium (Surface roughness Ra)

The magnetic recording medium thus obtained was measured for its surface roughness by means of a surface roughness/shape measuring apparatus Surfcom 553A available from Tokyo Seimitsu Co., Ltd. with a probe radius of 2 μm under a load of 30 mg at a magnification of 200,000 and a cutoff of 0.08 mm.

In the measurement of Ra (central line average roughness), a portion of the measurement length L is extracted from the roughness curve in the direction of the central line. When the central line of the extracted portion is designated as abscissa X, the direction of vertical factor is designated as ordinate Y, and the roughness curve is represented by y=f(x), the central line average roughness Ra (nm) is given by the following equation:

$$Ra = \frac{1}{L}\int_0^L |f(x)|dx$$

Output (4.7 MHz)

The 3.81-mm wide magnetic tape obtained was loaded in a DAT cassette to obtain a DAT tape cassette to be tested. The DAT tape cassette thus obtained was then loaded in Tape Evaluator Model 4500, available from Media Logic. In this arrangement, a 4.7 MHz signal was recorded on the magnetic tape. The output of the signal reproduced from the magnetic tape (reproduction output) was then measured. The recorded wavelength of the 4.7 MHz signal was 0.67 μm. The evaluation of the output was made with that of Example 1 as reference (0 dB).

Overwritability

For the evaluation of overwritability, DDS-1 drive (DAT drive for data recording) was used. A 1.2 MHz or 130 KHz signal was recorded on the magnetic tape. A 4.7 MHz or 1.5 MHz signal was then overwritten on the former signal. The output level of the residual 1.2 MHz or 130 KHz signal on the magnetic tape was then measured. The evaluation of overwritability was made with that of Comparative Example 2 as reference. A smaller residual output level means a better overwritability.

Running durability

For the evaluation of running durability, DDS-1 drive was used. The magnetic tape obtained was first measured for the initial block error rate (1st-BER). The results measured were then averaged over the whole length of the magnetic tape excluding the 5-minute portions at BOT (beginning of tape) and EOT (end of tape). Subsequently, recording and reproduction were made over the whole length of the magnetic tape 10 times. The 10th block error rate (10th-BER) was then measured (averaged over the whole length of the magnetic tape). The value thus obtained was then compared with the initial block error rate. A smaller rise in the block error rate (10th-BER/1st-BER) means a better running durability.

EXAMPLE 2

A first magnetic coating composition B having the following formulation and a second magnetic coating composition (b) were used. The procedure of Example 1 was followed to prepare a magnetic tape ((A–B)/B=1.25; (C–D)/D=1.06). The magnetic tape thus obtained was then evaluated in the same manner as in Example 1.

The first magnetic layer formed by the first magnetic coating composition B was then measured for coercive force and saturated magnetic flux density in the same manner as in Example 1. As a result, the first magnetic layer exhibited a coercive force of 1,900 Oe and a saturated magnetic flux density of 3,585 Gauss.

First magnetic coating composition B

The first magnetic coating composition B had the same formulation as the first magnetic coating composition A except that the contents of MR104, sulfonic group-containing polyurethane and Colonate HX were changed from 10 parts by weight to 12.5 parts by weight, from 7 parts by weight to 6 parts by weight, and from 4.5 parts by weight to 5 parts by weight, respectively.

Second magnetic coating composition (b)

The second magnetic coating composition (b) had the same formulation as the second magnetic coating composition (a) except that the contents of Mn—Zn ferrite, MR104, sulfonic metal base-containing polyurethane and Colonate L were changed from 32 parts by weight to 35 parts by weight, from 12 parts by weight to 9 parts by weight, from 6 parts by weight to 6.5 parts by weight, and from 3.5 parts by weight to 3 parts by weight, respectively.

EXAMPLE 3

A first magnetic coating composition W having the following formulation and a second magnetic coating composition (e) were used. The procedure of Example 1 was then followed to prepare a magnetic tape ((A−B)/B=1.30; (C−D)/D=2.03). The magnetic tape thus obtained was then evaluated in the same manner as in Example 1.

The first magnetic layer formed by the first magnetic coating composition W was then measured for coercive force and saturated magnetic flux density in the same manner as in Example 1. As a result, the first magnetic layer exhibited a coercive force of 1,895 Oe and a saturated magnetic flux density of 3,605 Gauss.

First magnetic coating composition W

The first magnetic coating composition W had the same formulation as the first magnetic coating composition A except that the contents of MR104, sulfonic group-containing polyurethane and Colonate HX were changed from 10 parts by weight to 8.5 parts by weight, from 7 parts by weight to 6 parts by weight, and from 4.5 parts by weight to 5 parts by weight, respectively, and VX-1 (trade name, nitrocellulose resin (number-average molecular weight: 7,300), available from Asahi Kasei Kogyo K.K.).

Second magnetic coating composition (e)

The second magnetic coating composition (e) had the same formulation as the second magnetic coating composition (b) except that a sulfobetaine-containing polyurethane "E-780" (available from Takeda Chemical Industries, Ltd.) was used instead of the sulfonic metal base-containing polyurethane.

EXAMPLE 4

The procedure of Example 1 was followed except that the first magnetic coating composition A and a second magnetic coating composition (f) were used to obtain a magnetic tape ((A−B)/B=3.48; (C−D)/D=5.16). The magnetic tape thus obtained was then evaluated in the same manner as in Example 1.

| Magnetic coating composition (f) | |
|---|---|
| Hexagonal system ferrite powder (hexagonal barium ferrite; coercive force: 1,690 Oe; saturated magnetization: 57 emu/g; average tabular diameter: 0.05 μm; tabularity ratio: 4) | 33 parts by weight |
| Acicular α-Fe₂O₃ (major axis length: 0.15 μm; axis ratio: 8; specific surface area: 54 m²/g) | 67 parts by weight |
| Alumina (average particle diameter: 0.3 μm) | 6.5 parts by weight |
| Carbon black (average primary particle diameter: 20 nm) | 2.5 parts by weight |
| MR104 (trade name, vinyl chloride resin, available from Nippon Zeon Co., Ltd.) | 12.5 parts by weight |
| UR-8300 (trade name, polyurethane resin, available from Toyobo Co., Ltd.) | 4.5 parts by weight |
| Colonate HX (trade name, polyisocyanate compound, available from Nippon Polyurethane Industry Co., Ltd.) | 4 parts by weight |
| Butyl stearate | 2 parts by weight |
| Myristic acid | 2 parts by weight |
| Methyl ethyl ketone | 84 parts by weight |
| Toluene | 56 parts by weight |
| Cyclohexanone | 28 parts by weight |

COMPARATIVE EXAMPLE 1

A first magnetic coating composition C having the following formulation and the second magnetic coating composition (a) were used. The procedure of Example 1 was then followed to prepare a magnetic tape ((A−B)/B=0.36; (C−D)/D=0.29). The magnetic tape thus obtained was then evaluated in the same manner as in Example 1.

The first magnetic layer formed by the first magnetic coating composition C was then measured for coercive force and saturated magnetic flux density in the same manner as in Example 1. As a result, the first magnetic layer exhibited a coercive force of 1,896 Oe and a saturated magnetic flux density of 3,583 Gauss.

First magnetic coating composition C

The first magnetic coating composition C had the same formulation as the first magnetic coating composition A except that the contents of MR104, sulfonic group-containing polyurethane and Colonate HX were changed from 10 parts by weight to 29 parts by weight, from 7 parts by weight to 12 parts by weight, and from 4.5 parts by weight to 8.5 parts by weight, respectively.

COMPARATIVE EXAMPLE 2

A first magnetic coating composition D having the following formulation and a second magnetic coating composition (c) were used. The procedure of Example 1 was then followed to prepare a magnetic tape ((A−B)/B=7.41; (C−D)/D=12.17). The magnetic tape thus obtained was then evaluated in the same manner as in Example 1. The results are set forth in Table 1.

The first magnetic layer formed by the first magnetic coating composition D was then measured for coercive force and saturated magnetic flux density in the same manner as in Example 1. As a result, the first magnetic layer exhibited a coercive force of 1,890 Oe and a saturated magnetic flux density of 3,607 Gauss.

First magnetic coating composition D

The first magnetic coating composition D had the same formulation as the first magnetic coating composition A except that the contents of MR104, sulfonic group-containing polyurethane and Colonate HX were changed from 10 parts by weight to 9 parts by weight, from 7 parts by weight to 6 parts by weight, and from 4.5 parts by weight to 3.5 parts by weight, respectively.

Second magnetic coating composition (c)

The second magnetic coating composition (c) had the same formulation as the second magnetic coating composition (a) except that the contents of Mn—Zn ferrite, MR104, and Colonate L were changed from 32 parts by weight to 27 parts by weight, from 12 parts by weight to 32 parts by weight, and from 3.5 parts by weight to 4 parts by weight, respectively.

COMPARATIVE EXAMPLE 3

A first magnetic coating composition E having the following formulation and a second magnetic coating composition (d) were used. The procedure of Example 1 was then followed to prepare a magnetic tape ((A–B)/B=6.91; (C–D)/D=9.71). The magnetic tape thus obtained was then evaluated in the same manner as in Example 1. The results are set forth in Table 1.

The first magnetic layer formed by the first magnetic coating composition E was then measured for coercive force and saturated magnetic flux density in the same manner as in Example 1. As a result, the first magnetic layer exhibited a coercive force of 1,868 Oe and a saturated magnetic flux density of 3,578 Gauss.

First magnetic coating composition E

The first magnetic coating composition E had the same formulation as the first magnetic coating composition A except that the contents of MR104, sulfonic group-containing polyurethane and Colonate HX were changed from 10 parts by weight to 6 parts by weight, from 7 parts by weight to 4 parts by weight, and from 4.5 parts by weight to 4 parts by weight, respectively.

Second magnetic coating composition (d)

The second magnetic coating composition (d) had the same formulation as the second magnetic coating composition (a) except that the contents of Mn—Zn ferrite, MR104, sulfonic metal base-containing polyurethane, and Colonate L were changed from 32 parts by weight to 28 parts by weight, from 12 parts by weight to 18 parts by weight, from 6 parts by weight to 9 parts by weight, and from 3.5 parts by weight to 4 parts by weight, respectively.

TABLE 1

|  | Example | | | | Comparative Example | | |
| --- | --- | --- | --- | --- | --- | --- | --- |
|  | 1 | 2 | 3 | 4 | 1 | 2 | 3 |
| First magnetic coating composition | A | B | W | A | C | D | E |
| Second magnetic coating composition | (a) | (b) | (e) | (f) | (a) | (c) | (d) |
| (A–B)/B | 2.13 | 1.25 | 1.30 | 3.48 | 0.36 | 7.41 | 6.91 |
| (C–D)/D | 2.75 | 1.06 | 2.03 | 5.16 | 0.29 | 1.19 | 9.71 |
| Average surface roughness (nm) | 4.5 | 4.8 | 4.6 | 3.9 | 7.2 | 6.9 | 9.6 |
| 4.75 MHz output (dB) | 0 | –0.5 | –0.4 | 0.2 | –2.6 | –2.3 | –4.7 |
| Overwritability (dB) |  |  |  |  |  |  |  |
| 1.5 MHz, 0.13 MHz | –3.6 | –3.1 | –3.3 | –3.0 | –2.6 | –2 | immeasurable[*1] |
| 4.7 MHz, 1.2 MHz | –0.3 | 0 | 0 | 0 | 0.9 | 0.7 |  |
| Running durability (10th-BER/1st-BER) | 5.4 | 3.6 | 3.2 | 3.9 | 10.9 | 13.1 | running suspended[*2] |

[*1]Immeasurable due to poor surface properties and raised thickness unevenness
[*2]Running was suspended due to poor surface properties and head clogging As can be seen in Table 1, the magnetic recording medium of the present invention comprises a first magnetic layer as an uppermost layer and a second magnetic layer adjacent to the first magnetic layer, each comprising a magnetic powder and a binder containing a vinyl chloride resin and/or cellulose resin, wherein the binder content in the first magnetic layer and the binder content in the second magnetic layer satisfy the specified relationship, and the total content of the vinyl chloride resin and the cellulose resin in the first magnetic layer and the total content of the vinyl chloride resin and the cellulose resin in the second magnetic layer satisfy the specified relationship. Thus, the magnetic recording medium of the present invention exhibits excellent output characteristics, overwritability, running durability and surface smoothness.

The magnetic recording medium of the present invention is excellent in surface smoothness, output characteristics, overwritability and running durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support having thereon a plurality of magnetic layers comprising a first magnetic layer provided as an uppermost layer and a second magnetic layer provided adjacent to said first magnetic layer, wherein said first and second magnetic layers each comprises a magnetic powder and a binder containing a polar group substituted vinyl chloride resin and/or cellulose resin, said magnetic powder is a spinel or a tabular hexagonal ferrite powder, the binder contents in said first magnetic layer and said second magnetic layer satisfy the relationship defined by the following equation (1), and the contents of said vinyl chloride resin and said cellulose resin in said first magnetic layer and said second magnetic layer satisfy the relationship defined by the following equation (2):

$$0.6 \leq (A-B)/B \leq 6 \quad (1)$$
$$0.4 \leq (C-D)/D \leq 11 \quad (2)$$

wherein A represents the ratio of the binder content in said second magnetic layer to the magnetic powder content in said second magnetic layer; B represents the ratio of the binder content in said first magnetic layer to the magnetic powder content in said first magnetic layer; C represents the ratio of the total content of the vinyl chloride resin and cellulose resin in said second magnetic layer to the magnetic powder content in said second magnetic layer; and D represents the ratio of the total content of the vinyl chloride resin and said cellulose resin in said first magnetic layer to the magnetic powder content in said first magnetic layer, wherein the thickness of said first magnetic layer is from 0.05 to 1.0 μm, and the thickness of said second magnetic layer is from 0.5 to 2.5 μm, the total amount of binders in the first magnetic layer is from 5 to 40 parts by weight based on 100 parts by weight of the magnetic powder, and wherein said binder also comprises a sulfo-group substituted polyurethane hardened with a hardener in an amount of 5 to 60% by weight based on the total weight of the binder.

2. The magnetic recording medium of claim 1, wherein the ratio of the content of said vinyl chloride resin to the content of said cellulose resin in said first magnetic layer is from 2/98 to 98/2.

3. The magnetic recording medium of claim 1, wherein the ratio of the content of said vinyl chloride resin to the content of said cellulose resin in said second magnetic layer is from 2/98 to 98/2.

4. The magnetic recording medium of claim 1, wherein the total content of said vinyl chloride resin and said cellulose resin in said first magnetic layer is from 10 to 90% by weight based on the total weight of the binder.

5. The magnetic recording medium of claim 1, wherein the total content of said vinyl chloride resin and said cellulose resin in said second magnetic layer is from 10 to 90% by weight based on the total weight of the binder.

* * * * *